March 24, 1936.　　　　C. O. BIBB　　　　2,035,293
TOOL
Filed May 21, 1934　　　4 Sheets-Sheet 1
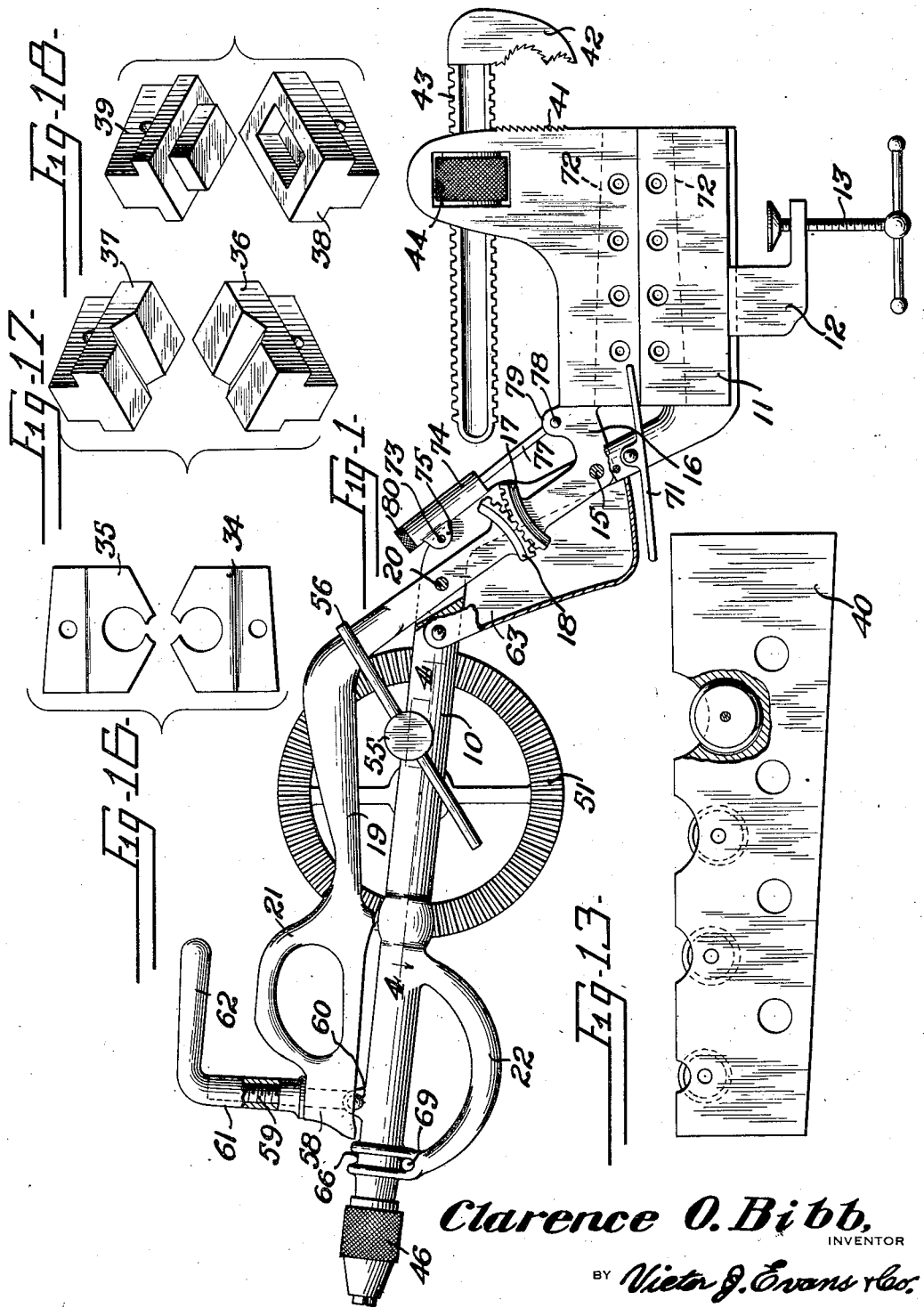
Clarence O. Bibb,
INVENTOR
BY Victor J. Evans & Co.
ATTORNEY March 24, 1936.                    C. O. BIBB                    2,035,293
                                    TOOL
                             Filed May 21, 1934            4 Sheets-Sheet 2
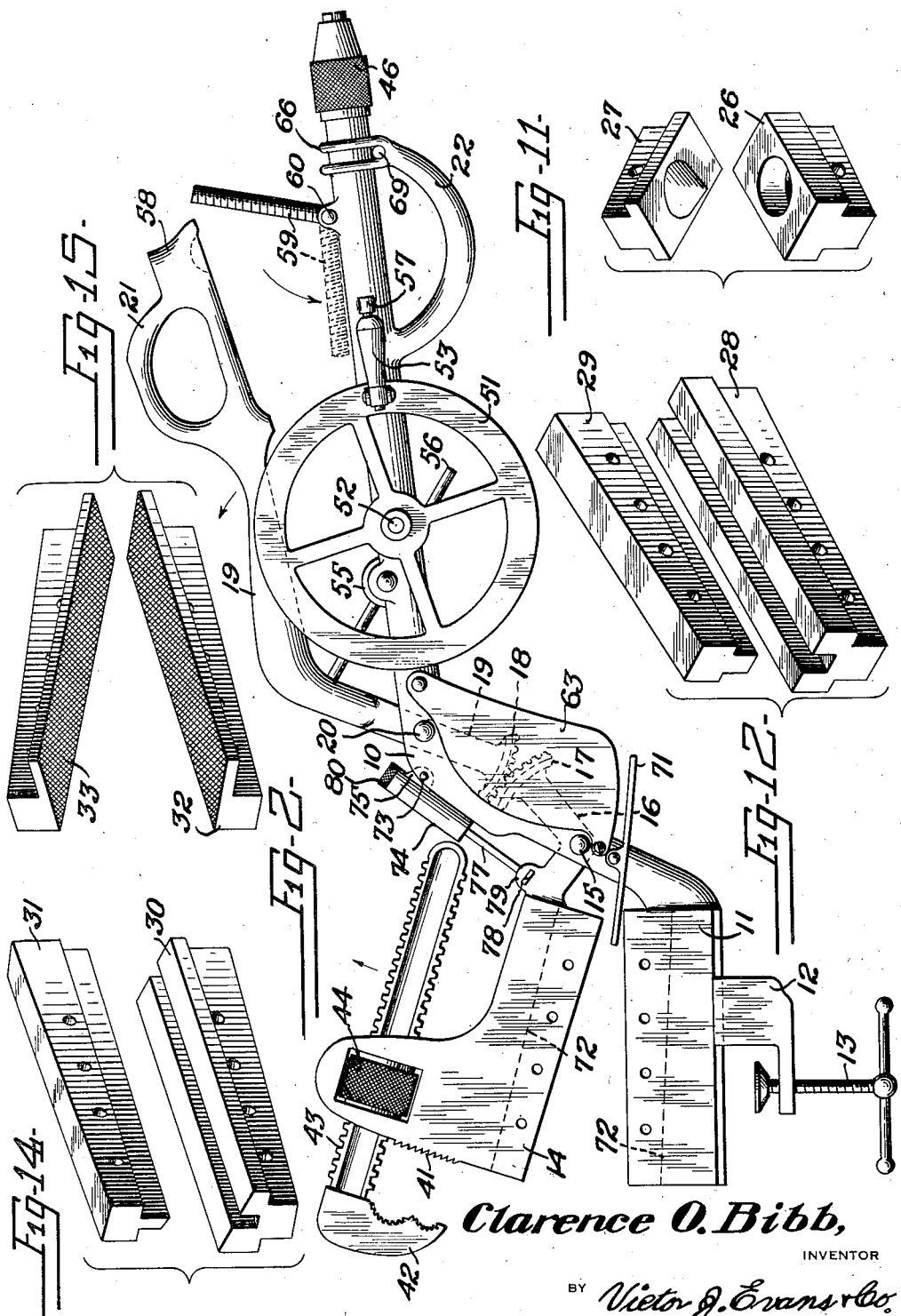
Clarence O. Bibb,
INVENTOR
BY Victor J. Evans & Co.
ATTORNEY March 24, 1936.  C. O. BIBB  2,035,293
TOOL
Filed May 21, 1934  4 Sheets-Sheet 3
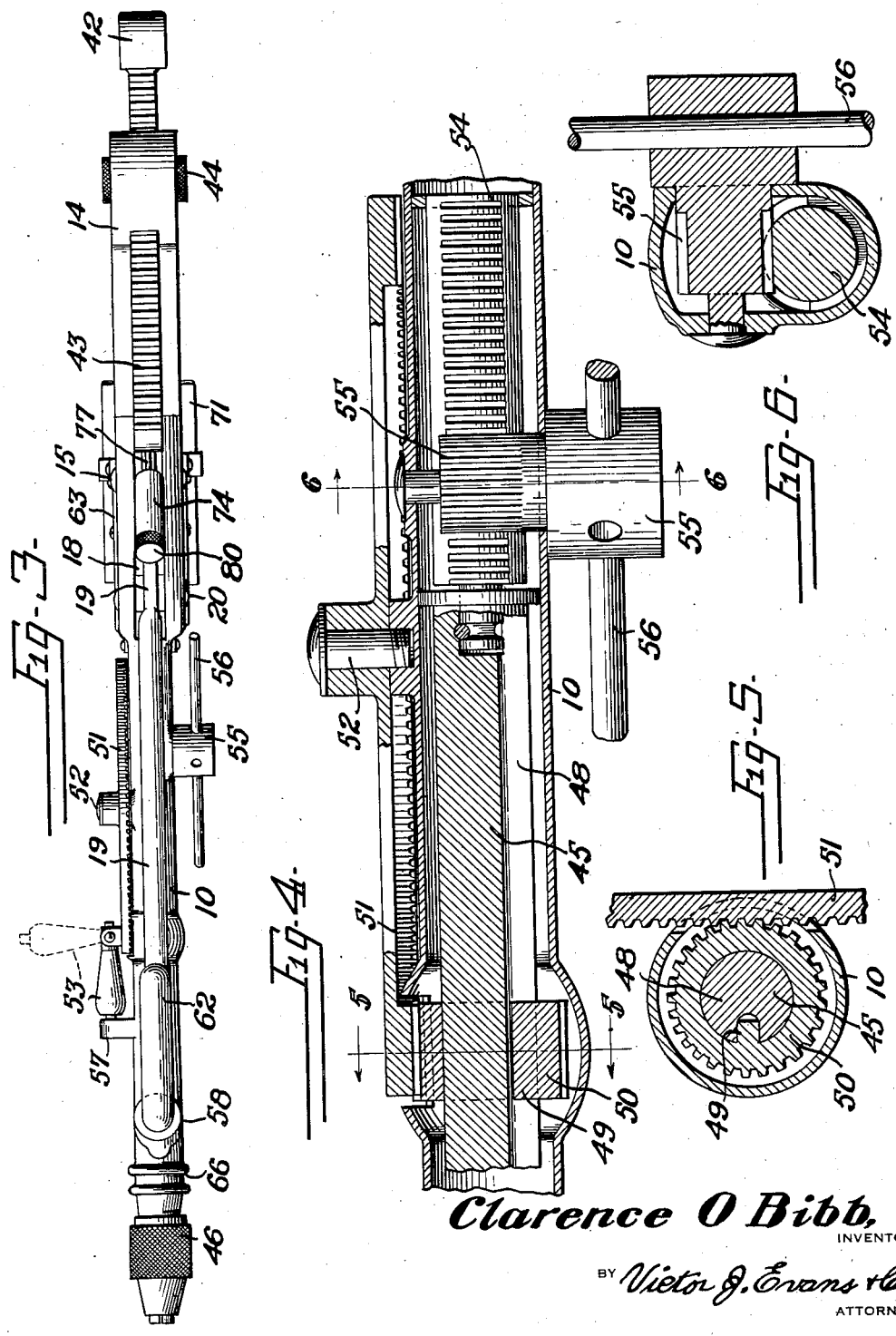
Clarence O Bibb,
INVENTOR
BY Victor J. Evans & Co.
ATTORNEY March 24, 1936.  C. O. BIBB  2,035,293
TOOL
Filed May 21, 1934  4 Sheets-Sheet 4
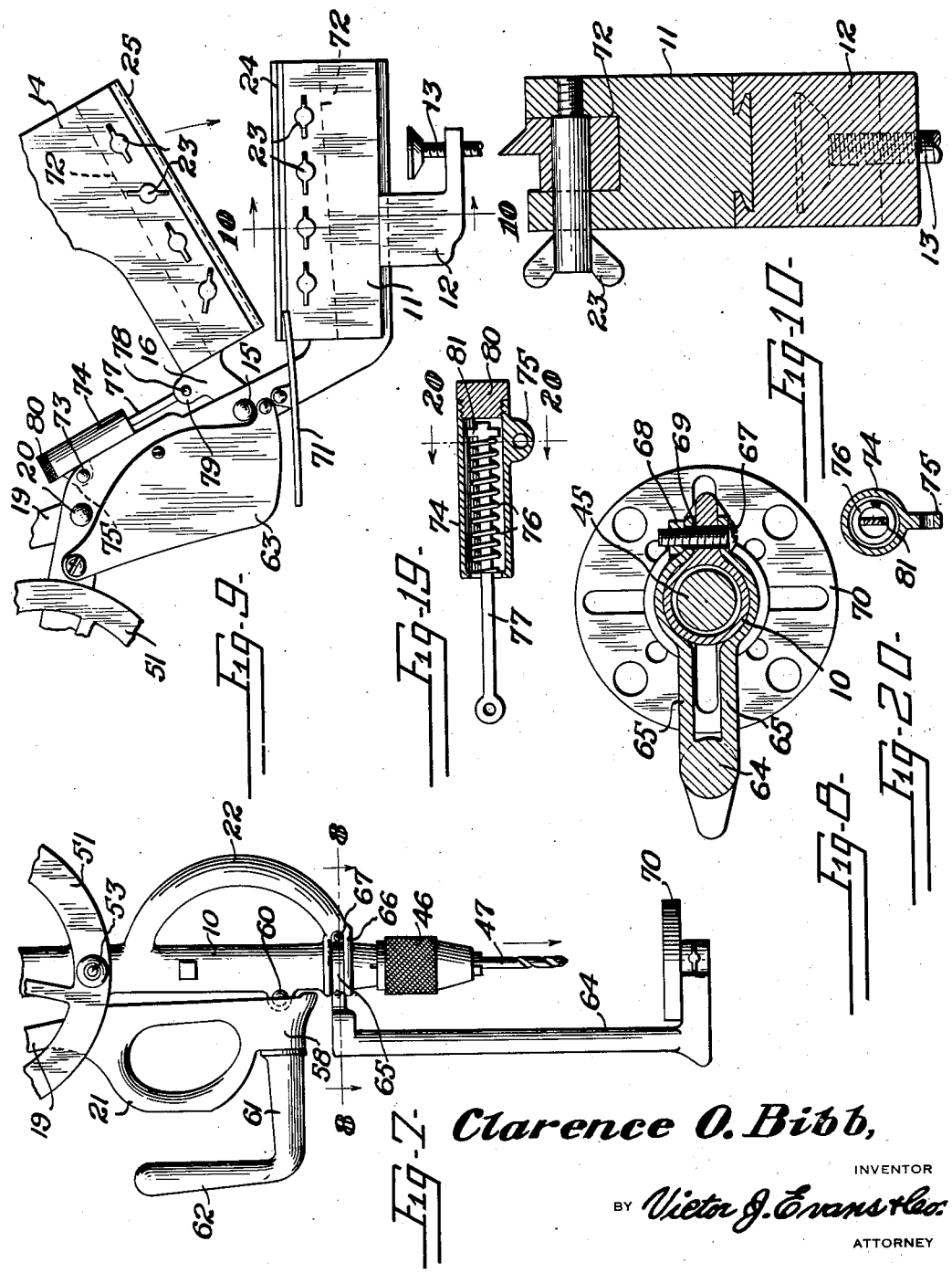
Clarence O. Bibb,
INVENTOR
BY Victor J. Evans & Co.
ATTORNEY

UNITED STATES PATENT OFFICE 2,035,293

TOOL

Clarence O. Bibb, Louisville, Ky.

Application May 21, 1934, Serial No. 726,804

2 Claims. (Cl. 29—33)

The invention relates to a tool and more especially to a convertible tool.

The primary object of the invention is the provision of a tool of this character, wherein the same is handy for use as a wrench, drill, cutter, punch, crimper and pincher and such tool is readily convertible for immediate use.

Another object of the invention is the provision of a tool of this character, wherein the same may be made fast to a support and various cutting operations performed thereby, as for example, shear cutting, pipe cutting, punching and other analogous operations, the device being novel in its make-up and assembly and reliable and efficient in its purposes, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:

Figure 1 is a side elevation of the tool constructed in accordance with the invention and portions thereof being broken away for illustrating adjuncts.

Figure 2 is a view similar to Figure 1 looking toward the opposite side of the tool and the same arranged for a cutting operation.

Figure 3 is a top plan view of the tool.

Figure 4 is a fragmentary enlarged sectional view taken on the line 4—4 of Figure 1 looking in the direction of the arrows.

Figure 5 is a sectional view on the line 5—5 of Figure 4 looking in the direction of the arrows.

Figure 6 is a sectional view on the line 6—6 of Figure 4 looking in the direction of the arrows.

Figure 7 is a fragmentary side elevation showing the tool arranged in a vertical support for its use as a drill.

Figure 8 is an enlarged sectional view on the line 8—8 of Figure 7 looking in the direction of the arrows.

Figure 9 is a fragmentary side elevation showing the tool usable for shear cutting.

Figure 10 is an enlarged transverse sectional view on the line 10—10 of Figure 9 looking in the direction of the arrows.

Figure 11 is an exploded perspective view of the companion punch unit for use in the tool.

Figure 12 is a view similar to Figure 11 showing the companion crimping unit for use in the tool.

Figure 13 is a side elevation, partly broken away, of a pipe cutting unit for use in the tool.

Figure 14 is a view similar to Figure 11 showing the companion stripping unit for use in the tool.

Figure 15 is a view similar to Figure 11 showing the companion jaws for use in the tool as pinchers.

Figure 16 is an exploded side elevation showing the companion thread cutting units or dies for use in the tool.

Figure 17 is a view similar to Figure 11 showing companion headed bolt or nut clamping blocks for use in the tool.

Figure 18 is a view similar to Figure 17 showing the companion hole punching dies or units for use in the tool.

Figure 19 is a detail longitudinal sectional view through the spring plunger associated with the tool for the opening of its holders.

Figure 20 is a sectional view on the line 20—20 of Figure 19 looking in the direction of the arrows.

Similar reference characters indicate corresponding parts throughout the several views in the drawings.

Referring to the drawings in detail, the tool comprises a frame 10 forming a stationary holder 11 carrying at one side a shiftable bench clamp 12 having the binding screw 13 so that the frame may be securely clamped to a work bench or other support, and companion to the said holder 11 at the other side is a movable or swinging holder 14 pivoted for its movement at 15 to the frame 10. The pivoted portion 16 of the said holder 14 is formed with a segmental gear 17 meshing with a cooperating segmental gear 18 of a lever 19 which is swingingly connected with the frame 10 by the pivot 20 so that on actuating the lever, movement will be imparted to the holder 14. The lever 19 is provided with a finger hold 21 and likewise the frame 10 has thereon the finger hold 22 to assure the proper grip by the hand of a person when it is desired to actuate the lever 19, as will be clearly apparent.

The holders 11 and 14 are provided with suitable seats and carry releasable winged screws or bolts 23 for the separable mounting thereon of varying working units corresponding to the kind of work to be executed by the tool. In Figure 9 of the drawings the separable units mounted upon the holders 11 and 14 are in the form of shear cutting blades 24 and 25, respectively, while in lieu of these may be mounted the companion punching units 26 and 27, respectively, as shown in Figure 11, or, in lieu of these, the crimping units 28 and 29, respectively, shown in Figure 12, or the units 30 and 31, respectively, shown in Figure 14, or the pincher units 32 and 33, respectively, shown in Figure 15, or the thread cutting dies or units 34 and 35, respectively, shown in Figure 16, or the blocks 36 and 37, respectively, shown in Figure 17, or the hole punching units or dies 38 and 39, respectively, shown in Figure 18, of the pipe cutters, a single one 40 being shown in Figure 13 of the drawings.

The holder 14 is provided with the stationary jaw 41 of a wrench for coaction with the movable jaw 42 thereof, its shank or stem 43 being slidably fitted in said holder and having coacting therewith the knurled adjusting nut 44 suitably fitted within the holder 14 and thus it being seen that the wrench is available for service and is a part of the tool.

The frame 10 is constructed for rotatably and slidably receiving a drill shaft 45 which at the end exteriorly of said frame carries a suitable drill chuck 46 for a drill 47, the shaft being formed with a longitudinal key way 48 for its slidable connection with the key 49 of a driven pinion 50 loosely fitted upon said shaft 45. The pinion meshes with a driving gear or power wheel 51 journaled on the stud 52 carried by the frame 10 and the gear or power wheel 51 carries a swinging handle 53 which is usable for hand power in the rotation of the gear or wheel 51 and the driving of the pinion 50 for transmission of motion to the chuck 46 as carried by the shaft 45. Swiveled or loosely coupled with the inner end of the shaft 45 is a rack 54 meshing with a rack gear 55 suitably journaled in the frame 10 and carrying outside of the latter a handle 56, whereby the rack gear 55 can be manually turned for advancing or retracting the rack 54 which in turn shifts the shaft 45 for the feeding of the chuck with its drill to or from the work. The handle 56 is located at one side of the frame while the driving gear or wheel 52 is at the opposite side of said frame, thus being convenient for use in the handling of the tool.

Carried by the frame 10 is a keeper lug 57 with which is engageable a resilient releasing latch 57' on the handle 53 when the same is swung in the direction of said lug for engagement therewith and under this engagement the gear or wheel 52 will be held against rotation, the handle when in position for the rotation of the gear or wheel 52 being shown by dotted lines in Figure 3 of the drawings.

The handle 21 of the lever 19 is formed with an eye end 58 for receiving a holding screw 59 pivoted at 60 to the frame 10 so that the lever may be held stationary and this screw 59 has tapped thereon a cap 61 formed with a crank 62 so that the cap can be turned for binding action against the eye end 58 of the handle 21, as will be clear from Figure 1 of the drawings.

Removably fitted to the frame 10 is a guard 63 for protection to a user of the tool against injury when operating the segmental gears 17 and 18 through the instrumentality of the lever 19 when the tool is operating as a cutter, punch, pipe cutter, etc.

The frame 10 of the tool can be readily supported for vertical drilling action and a stand 64 which, in this instance, constitutes a support, has formed at its upper end the fork-like clamp 65 to partially embrace the frame at the seat 66 for said clamp which is separably connected therewith by a screw 67 carrying the nut 68, the screw being passed through a suitable hole 69 provided in the frame 10. At the bottom of the support or holder is a work table or rest 70 for a piece of work to be drilled.

Carried by the frame 10 is a pivoted guide 71 for directing the work operated upon when presented between the units fitted with the holders 11 and 14 of the tool.

The holder 11 has provided therein the channeled seat 72 for accommodating one of the pair of units to be carried by the stationary holder 11 of the tool.

Swingingly supported by the frame 10, preferably by a pivot 73, is a barrel 74, the latter formed with the external ear 75 for said pivot 73 and having arranged therein a coiled tensioning spring 76 active upon a plunger 77 which is pivoted at 78 to an ear 79 formed on the portion 16 of the holder 14, and under the action of the spring 76 the holders 11 and 14 will be automatically spread apart so as to be in open position until manually closed in the operation of the tool. The barrel 74 at its outer end has fitted therein a removable cap 80 to permit access to the interior of the barrel, while the plunger 77 carries a cross piece 81 against which bears the spring 76, the latter being also seated against the inner end of the barrel 74. This spring 76 is compressed on the outward movement of the plunger 77 from within the barrel 74 so that normally the holders 11 and 14 will be spread apart or in open position.

Without a detailed description of the adaptability of the tool for different kinds of operations, particularly as heretofore enumerated, it is thought that the use of the tool for the variety of services will be perfectly clear from the disclosure in the drawings and for this reason, and also brevity, a more extended explanation has been omitted.

What is claimed is:

1. In a tool for the purpose set forth a frame comprising a member having a holder integral with one of the ends thereof, a holder pivotally secured to the frame and swingable toward or away from the stationary holder, spring influenced means pivoted to the frame and to the swingable holder for influencing the latter away from the stationary holder, a lever pivoted to the frame, intermeshing means between the lever and the swingable jaw to permit the lever, when thrown, to influence the swingable holder toward or away from the stationary holder against the influence of the spring means and means, comprising pivoted and adjustable elements for holding the outer end of the lever at adjusted positions on the frame.

2. A tool as in claim 1 in which the stationary holder has a slidable clamp thereon for sustaining the tool on a support.

CLARENCE O. BIBB.